(12) United States Patent
Cutler et al.

(10) Patent No.: US 6,219,340 B1
(45) Date of Patent: Apr. 17, 2001

(54) DISPLAY OF CODE POWER IN ALL SYMBOL RATES IN A SINGLE SCREEN FOR CODE-DIVISION MULTIPLE ACCESS SIGNALS EMPLOYING LAYERED ORTHOGONAL CODES

(75) Inventors: Robert T. Cutler, Marysville, WA (US); John E. Neeley, Santa Rosa, CA (US); Harry G. Plate, Snohomish, WA (US)

(73) Assignee: Agilent Technologies Inc., Palo Alto, CA (US)

(*) Notice: Subject to any disclaimer, the term of this patent is extended or adjusted under 35 U.S.C. 154(b) by 0 days.

(21) Appl. No.: 09/075,057

(22) Filed: May 8, 1998

(51) Int. Cl.$^7$ ...................................................... H04J 1/16
(52) U.S. Cl. ............................................ 370/241; 702/60
(58) Field of Search ..................................... 370/241, 203, 370/342, 335, 311; 702/57, 60, 61; 324/76.11

(56) References Cited

U.S. PATENT DOCUMENTS

| | | | |
|---|---|---|---|
| 5,526,291 | * | 6/1996 | Lennen . |
| 5,987,320 | * | 11/1999 | Bobick ................................ 455/423 |
| 6,052,584 | * | 4/2000 | Harvey et al. ....................... 455/423 |
| 6,088,659 | * | 7/2000 | Kelley et al. .......................... 702/62 |
| 6,104,983 | * | 8/2000 | Nakada ................................. 702/66 |

OTHER PUBLICATIONS

Data sheet for Anritsu MS8607A available from Anritsu America Inc., 365 W Passaic St., Rochelle Park, NJ 07622–3017.

Data sheet for IS–95 DDMA Charateristics Measurement Functions, available from Advantest America Inc., 3201 Scott Blvd., Santa Clara, CA 95054–3008, Jan. 1997.

Raymond A. Birgenheier—Overview of Code–Domain Power, Timing, and Phase Measurements; Hewlett–Packard Journal, vol. 47, No. 1, Feb. 1996; pp. 73–93.

* cited by examiner

*Primary Examiner*—Douglas Olms
*Assistant Examiner*—David Vincent

(57) ABSTRACT

Power levels for a code-division multiple access (CDMA) signal with layered orthogonal codes are displayed. When displaying power levels for multiple code layers, a power level for each active code channel is displayed using a bar. A width of the bar indicates in which code layer each active code channel is active. A color of the bar also can be used to indicate in which code layer each active code channel is active. For example, a power level for each active code channel is displayed using a hollow bar and a power level for each inactive code channel is displayed using a line. Alternatively, a power level for each inactive code channel is displayed using a hollow bar and power level for each active code channel is displayed using a solid bar. When displaying a power level for a single code layer, a power level for each active code channel in the single code layer is displayed using a hollow bar, and a power level for each code channel which is inactive in the single code layer is displayed using a line. Alternatively, when displaying a power level for a single code layer, a power level for each active code channel in the single code layer is displayed using a solid bar, and a power level for each code channel which is inactive in the single code layer is displayed using a hollow bar.

23 Claims, 4 Drawing Sheets

DISPLAY OF CODE POWER IN ALL SYMBOL RATES IN A SINGLE SCREEN FOR CODE-DIVISION MULTIPLE ACCESS SIGNALS EMPLOYING LAYERED ORTHOGONAL CODES

BACKGROUND

The present invention concerns signal analysis and pertains particularly to display of code power in all symbol rates in a single screen for code-division multiple access signals employing layered orthogonal codes.

Code-division multiple access (CDMA) is a class of modulation that uses specialized codes to provide multiple communication channels in a designated segment of the electromagnetic spectrum. In 1994, the Telecommunications Industry Association (TIA) released the IS-95 and IS-97 standards which ensure the mobile station/base-station compatibility of cellular telephone systems which use dual-mode CDMA systems.

In order to measure the power, time, frequency, and phase of code domain signals, code domain analyzer systems are used. For example, the HP 83203B CDMA cellular adapter, available from Hewlett-Packard Company, having a business address of 3000 Hanover Street, Palo Alto, Calif. 94304, is designed to make the base station transmitter measurements specified in the IS-95 and IS-97 standards.

The measurement algorithms used by the HP 83203B CDMA cellular adapter provide a characterization of the code domain channels of a CDMA base station transmitter. One of the measurements, called code domain power, measures the distribution of power in the code domain channels. This measurement can be used to verify that the various channels are at expected power levels and to determine when one code domain channel is leaking energy into the other code domain channels. The crosscoupling of code domain channels can occur for many reasons. For example, time misalignment of the channels, can negate the orthogonal relationship among code domain channels. Additionally, impairment of the signals caused by nonideal or malfunctioning components in the transmitter can cause crosscoupling. To determine the quality of the transmitter signal, the HP 83203B CDMA cellular adapter measures a waveform quality factor, p. The waveform quality factor is the amount of transmitter signal energy that correlates with an ideal reference signal when only the pilot channel is transmitted. The results are shown in graphic form on a display of the HP 83203B CDMA cellular adapter. In prior art code domain analyzers, such as the HP 83203B CDMA cellular adapter, it has been possible to view code power for only a single symbol rate (code layer) per screen.

For further information on the general concepts of CDMA signals and measurements, the signal flow of the measurement algorithms used for CDMA signals, the specifications from the IS 97 standard and performance predictions for the measurement algorithms based on mathematical modeling and simulations, and some typical results of measurements, see Raymond A. Birgenheier, *Overview of Code-Domain Power, Timing and Phase Measurements, Hewlett-Packard Journal*, February 1996, pp. 73–93.

SUMMARY OF THE INVENTION

In accordance with the preferred embodiment of the present invention, power levels for a code-division multiple access (CDMA) signal with layered orthogonal codes are displayed. When displaying power levels for multiple code layers, a power level for each active channel is displayed using a bar. A width of the bar indicates in which code layer each active channel is active.

Additionally, in the preferred embodiment, a color of the bar also indicates in which code layer each active channel is active. In one embodiment, a power level for each active channel is displayed using a hollow bar and a power level for each inactive channel is displayed using a line. In an alternative embodiment, a power level for each inactive channel is displayed using a hollow bar and power level for each active channel is displayed using a solid bar.

Likewise, when displaying a power level for a single code layer, a power level for each active channel in the single code layer is displayed using a hollow bar, and a power level for each channel which is inactive in the single code layer is displayed using a line. Alternatively, when displaying a power level for a single code layer, a power level for each active channel in the single code layer is displayed using a solid bar, and a power level for each channel which is inactive in the single code layer is displayed using a hollow bar.

The present invention expands the display capability of the prior art allowing power levels in multiple layers to be displayed simultaneously.

DESCRIPTION OF THE PREFERRED EMBODIMENTS

Figure 1:
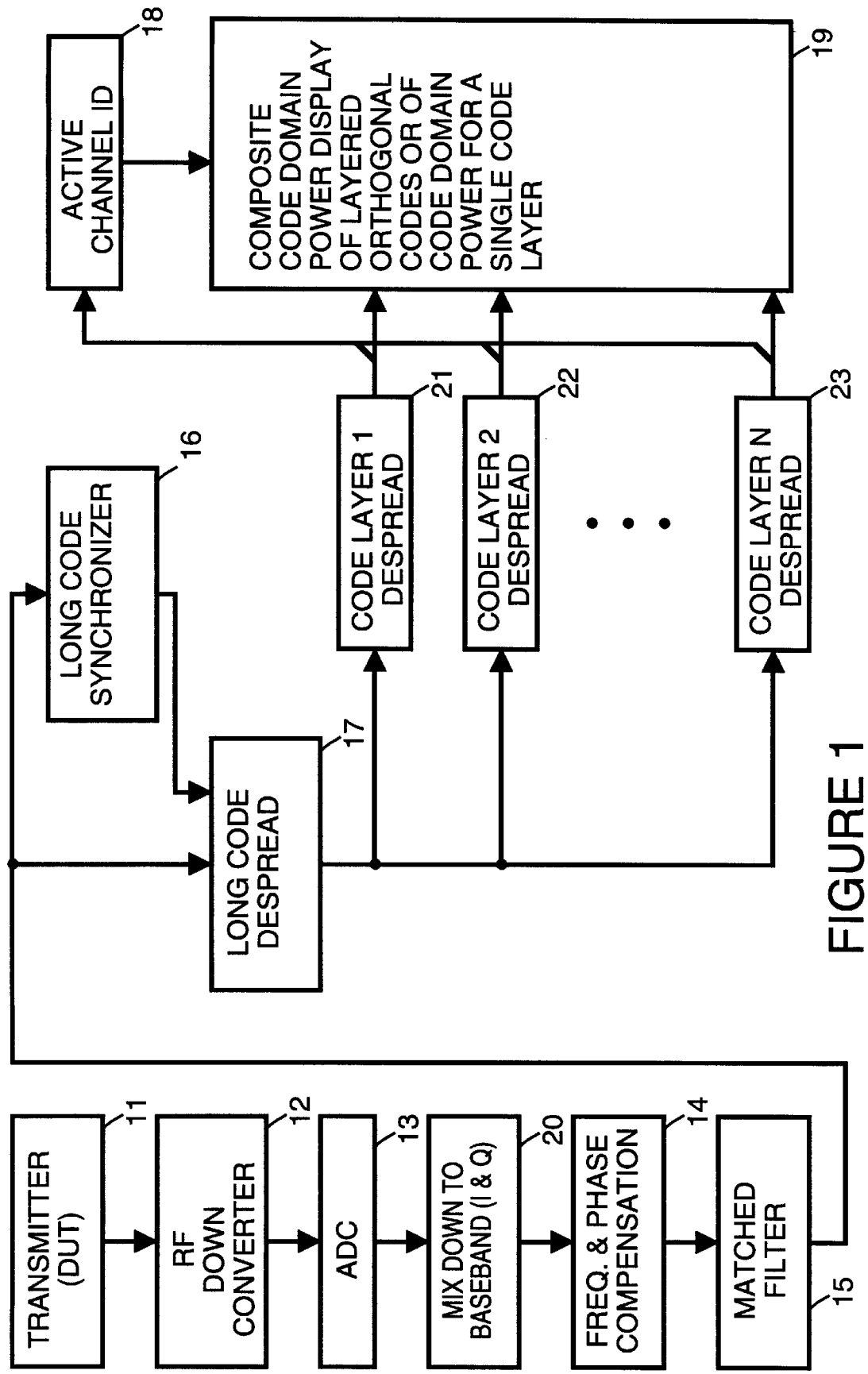
FIG. 1 is a simplified block diagram which illustrates generation of a display of code domain power in accordance with a preferred embodiment of the present invention.

FIG. 1 is a simplified block diagram which illustrates generation of a display of code domain power within a code domain analyzer. Transmitter 11, which is the device-under-test (DUT) produces a code-division multiple access (CDMA) signal. A radio frequency down converter down converts the signal to an intermediate frequency (IF) signal of approximately 6 megahertz. An analog-to-digital converter (ADC) 13 samples the IF signal at approximately 25 million samples per second (MSa/s) to produce a digitized signal (which is at 6 MHz). Mix down to base band (I and Q) block 20 takes the digitized signal (which is at 6 MHz) and converts it to a complex baseband signal (I and Q).

A frequency and phase compensation block 14 compensates the complex baseband signal (I and Q) to remove differences in phase and frequency between the complex baseband signal and the carrier signal to produce a compensated signal. A matched filter 15 limits the bandwidth of the compensated signal and produces zero intersymbol interference (zero ISI) in a resulting filtered signal.

A long code synchronizer 16 establishes the timing of the final spreading code (long code) in the signal transmitted by transmitter 11. A long code despread 17 uses timing information from long code synchronizer 16 to despread the filtered signal from matched filter 15. Long code despread 17 produces a despread signal which has the effects of the final spreading of the transmitted signal removed.

There is a code layer despread block for each code layer (symbol rate) analyzed by the code domain analyzer. For example, FIG. 1 shows a code layer 1 despread block 21 which receives the despread signal and outputs the code-domain power for the number of code channels (e.g., 4) associated with code layer 1. A code layer 2 despread block 22 receives the despread signal and outputs the code-domain power for the number of code channels (e.g., 8) associated with code layer 2. A code layer n despread block 23 receives the despread signal and outputs the code-domain power for the number of code channels (e.g., $2^{n+1}$) associated with code layer n. For more information on the processing of CDMA signals, as described above, see for example, Raymond A. Birgenheier, *Overview of Code-Domain Power, Timing and Phase Measurements, Hewlett-Packard Journal*, February 1996, pp. 73–93.

An active code channel identification (ID) block 18, identifies which code channels are active within each code layer. Active code channel ID block 18 performs this by analyzing power distribution over the code channels and/or by searching for known data sequences within a given code domain channel.

A code domain power display 19 generates a code domain power display for either a single code layer or for code layered orthogonal codes in response to input from a user. When displaying code domain power display for a single code layer, code domain power display 19 determines code domain power for each code channel in the code layer from the associated code layer despread. From the output of active code channel ID block 18, code domain power display 19 determines which code channels within the code layer are active. From this information, code domain power display 19 creates a display showing power levels for each active code channel for the code layer, as well as power levels for each of the code channels which are not active in the code layer. For example, power level for the active code channels in the code layer are shown using hollow bars and power level for the inactive code channels in the code layer are shown using lines. Alternatively, power level for the active code channels in the code layer are shown using solid bars and power level for the inactive code channels in the code layer are shown using hollow bars.

When displaying code domain power display for multiple code layers, code domain power display 19 determines which code channels within each code layer are active from the output of active code channel ID block 18. Code domain power display 19 also determines code domain power for each active code channel in each code layer from the associated code layer despread. From this information, code domain power display 19 creates a display showing power levels for each active code channel for each code layer, as well as power levels for each of the code channels (in the code layer with the most code channels) which are not active in any code layer. For example, power level for the active code channels are shown using hollow bars and power level for the inactive code channels are shown using lines. Alternatively, power level for the active code channels are shown using solid bars and power level for the inactive code channels are shown using hollow bars. When displaying code domain power display for multiple code layers, the inactive channels are shown for the slowest code layer (narrowest bars).

Code domain power display 19 signifies which code layer each active code channel is in by the width of the bars and by the color of the bars. The width of the bars used for a code layer is determined by the number of code channels in that code layer. A faster code layer will have a bar that is twice as wide as a next slower code layer. For example, if code layer one has four code channels, the width of the bar for each channel will be ¼ of the total display width. Code layer two will have eight code channels and the width of the bar for each channel in code layer two will be ⅛ of the total display width. Code layer three will have sixteen code channels and the width of the bar for each channel in code layer three will be ¹⁄₁₆ of the total display width. Code layer four will have thirty-two code channels and the width of the bar for each channel in code layer four will be ¹⁄₃₂ of the total display width. And so on. The symbology is that a faster channel precludes the use of all slower channels that would otherwise occupy that part of the display.

Figure 2:
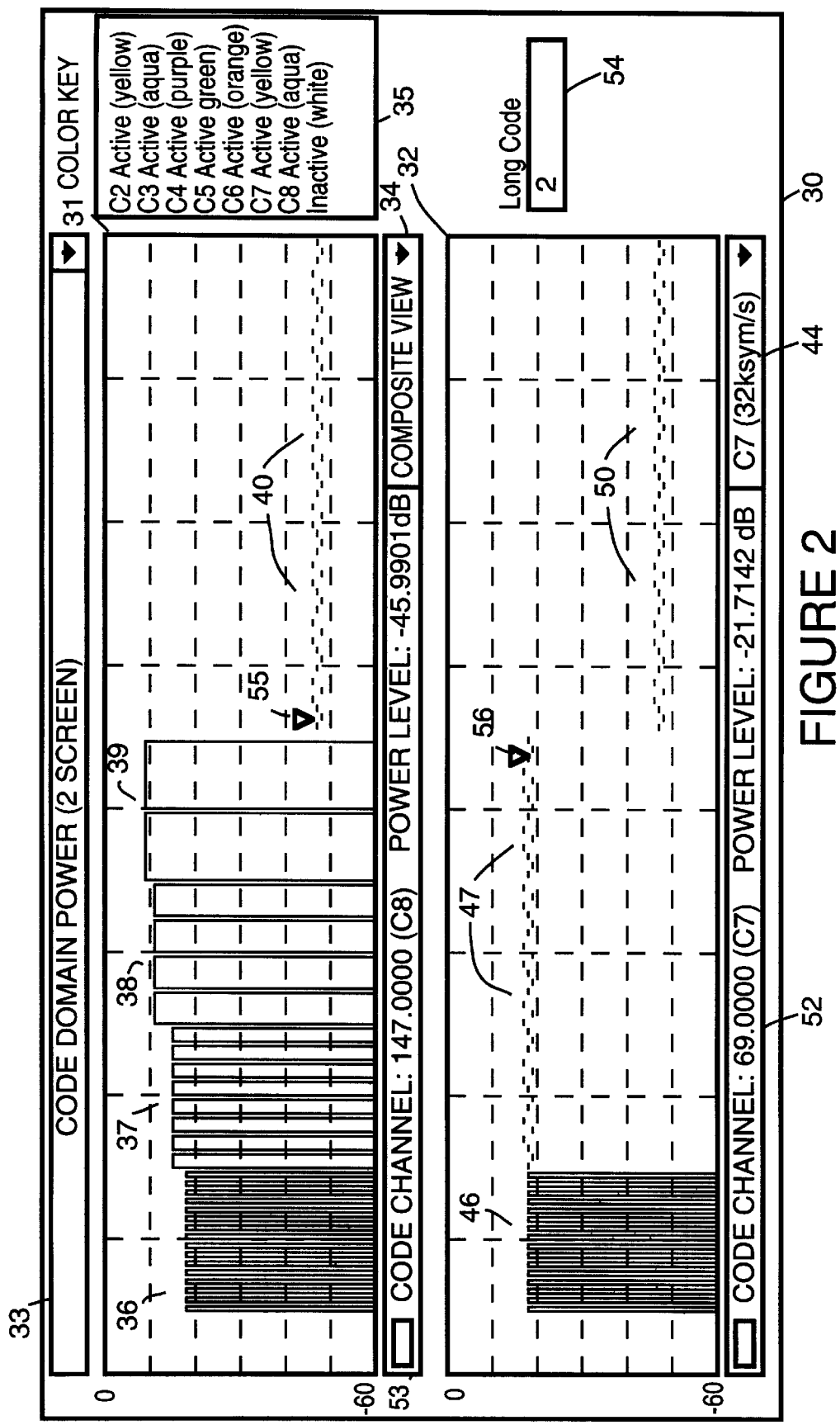
FIG. 2 shows a display with two screens which each display code domain power for a signal, the first screen showing symbol rates for a composite of channels and the second screen showing power symbol rates for a single channel while code power of other symbol rates are still visible in accordance with a preferred embodiment of the present invention.

FIG. 2 shows an example of a display and interface generated by code domain power display 19. A pull down menu 33 is used to select a number of screens displayed in a window 30. For the display shown in FIG. 2, two screens have been selected.

A color key 35 identifies the color used for code channels in each code layer. For example, hollow bars for active code channels in C2 active code layer are displayed using the color yellow. Hollow bars for active code channels in C3 active code layer are displayed using the color aqua. Hollow bars for active code channels in C4 active code layer are displayed using the color purple. Hollow bars for active code channels in C5 active code layer are displayed using the color green. Hollow bars for active code channels in C6 active code layer are displayed using the color orange. Hollow bars for active code channels in C7 active code layer are displayed using the color yellow. Hollow bars for active code channels in C8 active code layer are displayed using the color aqua. Lines for inactive code channels are viewed using the color white.

A box 54 indicates the long code used for despreading by long code synchronizer 16 and long code despread 17. A system may have multiple long codes which can be used for the final spreading. The long code number displayed in box 54 indicates which long code is currently being used.

A pull down menu 34 is used to select a view for a first screen 31. For screen 31, the current selection is composite view. In the preferred embodiment the background for screen 31 is dark.

Power levels for active code channels in the C7 active code layer are displayed using hollow bars 36. Hollow bars are identified as power levels for active code channels in the C7 active code layer by the width of each hollow bar and by the color (yellow in the preferred embodiment) of the outline for each hollow bar.

Power levels for active code channels in the C6 active code layer are displayed using hollow bars 37. Hollow bars are identified as power levels for active code channels in the C6 active code layer by the width of each hollow bar and by the color (orange in the preferred embodiment) of the outline for each hollow bar.

Power levels for active code channels in the C5 active code layer are displayed using hollow bars 38. Hollow bars are identified as power levels for active code channels in the C5 active code layer by the width of each hollow bar and by the color (green in the preferred embodiment) of the outline for each hollow bar.

Power levels for active code channels in the C4 active code layer are displayed using hollow bars 39. Hollow bars are identified as power levels for active code channels in the C4 active code layer by the width of each hollow bar and by the color (purple in the preferred embodiment) of the outline for each hollow bar.

In screen 31, the power level for code channels which are inactive are displayed by lines 40. In the preferred embodiment, lines 40 are white. When displaying code domain power display for multiple code layers, the inactive channels are shown for the slowest code layer (narrowest bars).

A marker 55 allows a user to determine code layer, code channel number and power level, as displayed in a text line 53, for a particular code channel displayed in first screen 31. For example, text line 53 indicates that where marker 55 is pointing, the code channel is 147 (in code layer C8) and the power level is −45.9901 dB.

A pull down menu 44 is used to select a view for a second screen 32. For screen 32, the current selection is the C7 active code layer (32 ksyms/s). In the preferred embodiment the background for screen 32 is dark.

Power levels for active code channels in the C7 active code layer are displayed using hollow bars 46. Hollow bars are identified as power levels for active code channels in the C7 active code layer by the width of each hollow bar and by the color (yellow in the preferred embodiment) of the outline for each hollow bar.

In screen 32, the power level for code channels which are inactive in the C7 active code layer are displayed by lines 47 and lines 50. In the preferred embodiment, lines 47 and lines 50 are white. A marker 56 allows a user to determine code layer, code channel number and power level, as displayed in a text line 52, for a particular code channel displayed in second screen 32. For example, text line 52 indicates that where marker 56 is pointing, the code channel is 69 (in code layer C7) and the power level is −21.7142 dB. Although not shown in screen 32, it is possible in other embodiments of the present invention to annotate the x-axis with channel numbers since only a single code layer is displayed.

Figure 3:
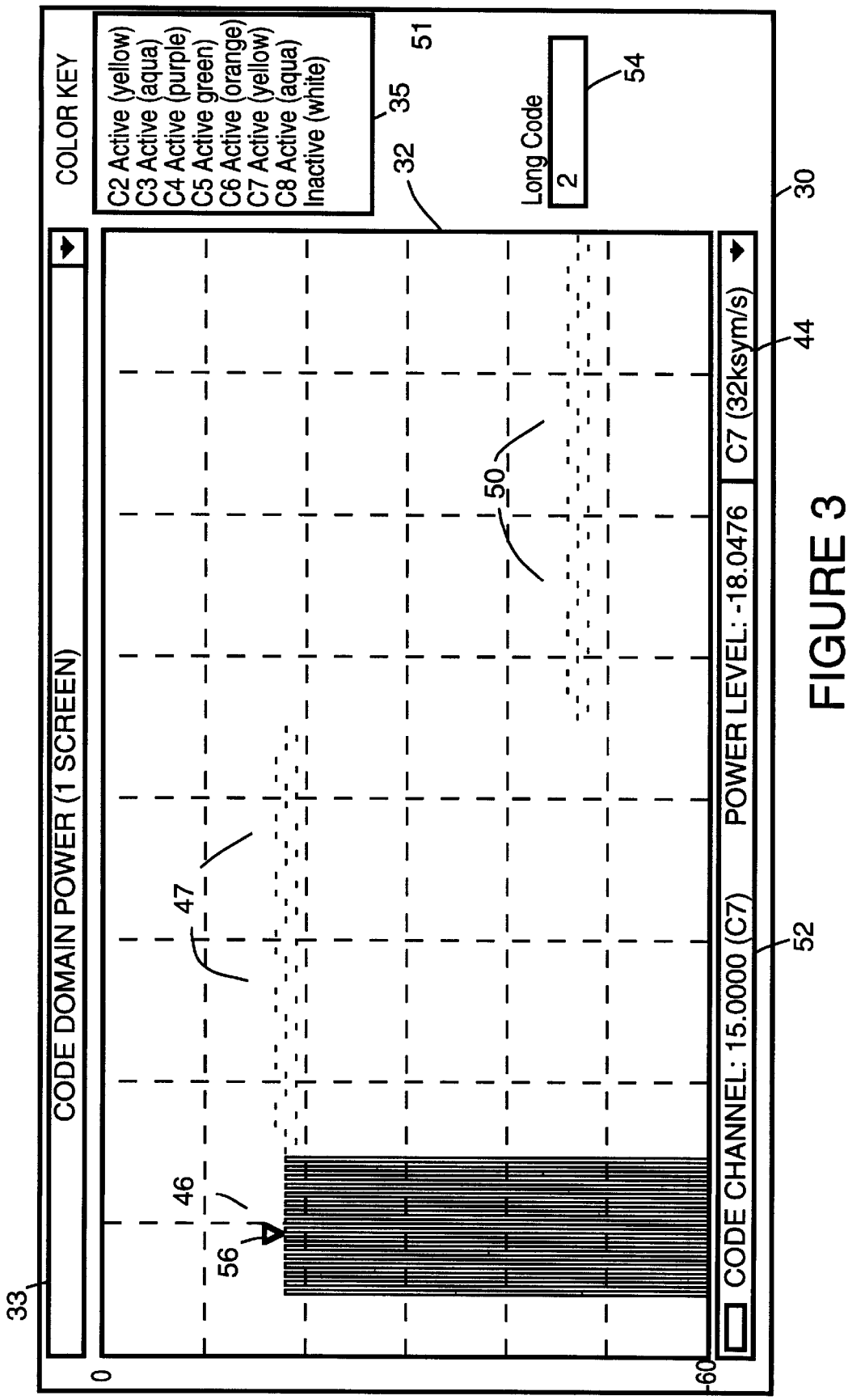
FIG. 3 shows a zoom of a display with a single screen which displays power symbol rates for a single channel while code power of other symbol rates are still visible in accordance with a preferred embodiment of the present invention.

FIG. 3 shows what happens when a user utilizes pull down menu 33 to select one screen for display in window 30. In FIG. 2, pull down menu 44 has been used to select a view for remaining screen 32. For screen 32, the current selection is the C7 active code layer (32 ksyms/s). In the preferred embodiment the background for screen 32 is dark.

Power levels for active code channels in the C7 active code layer are displayed using hollow bars 46. Hollow bars are identified as power levels for active code channels in the C7 active code layer by the width of each hollow bar and by the color (yellow in the preferred embodiment) of the outline for each hollow bar.

In screen 32, the power level for code channels which are inactive in the C7 active code layer are displayed by lines 47 and lines 50. In the preferred embodiment, lines 50 are white.

Figure 4:
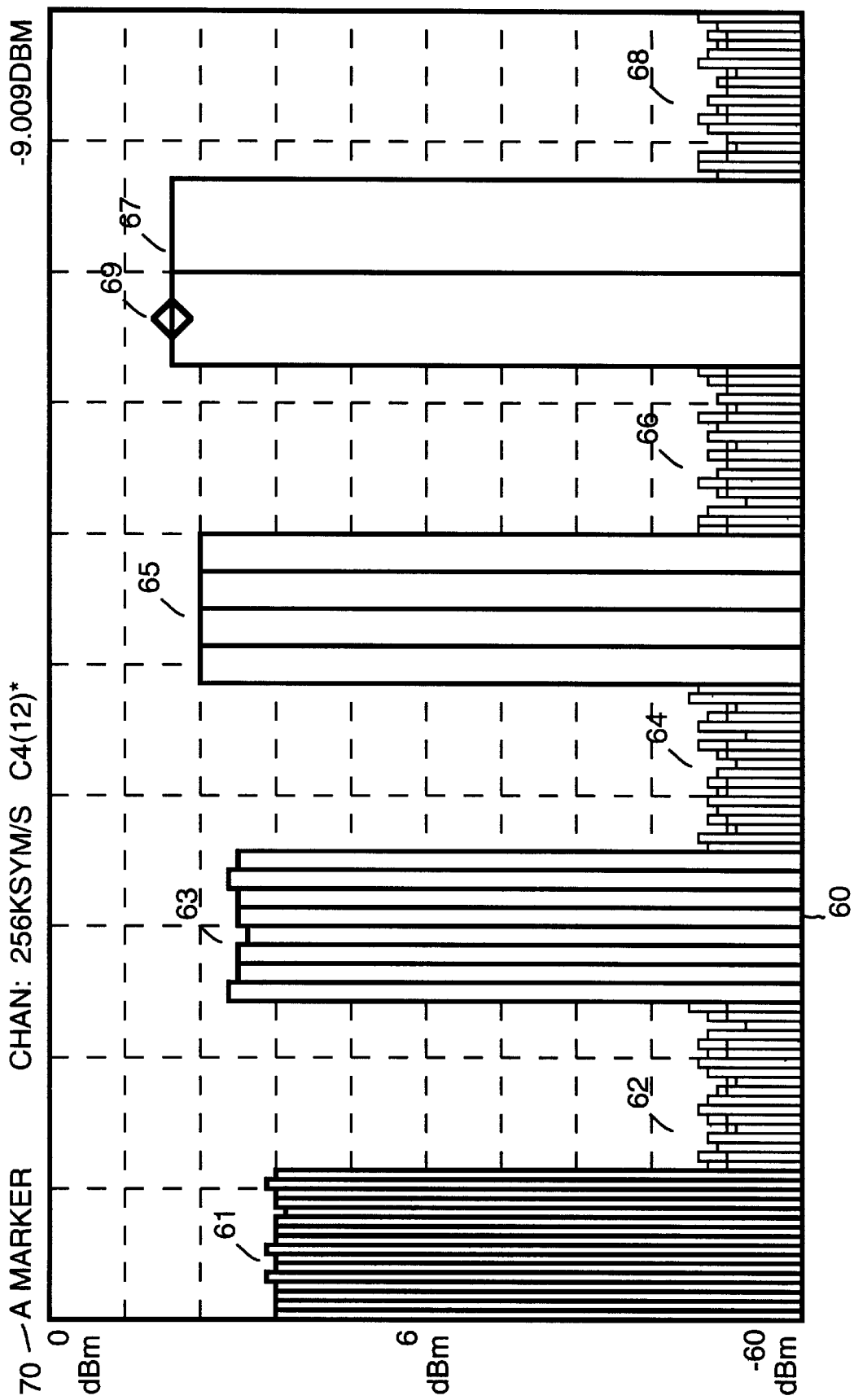
FIG. 4 shows a display showing symbol rates for a composite of channels in accordance with an alternative preferred embodiment of the present invention.

FIG. 4 shows an alternative example of a display and interface generated by code domain power display 19. In a window 60 the background is dark.

Power levels for active code channels in the C7 active code layer are displayed using solid bars 61. Solid bars are identified as power levels for active code channels in the C7 active code layer by the width of each solid bar and by the color (aqua in the preferred embodiment) of the outline for each solid bar.

Power levels for active code channels in the C6 active code layer are displayed using solid bars 63. Solid bars are identified as power levels for active code channels in the C6 active code layer by the width of each solid bar and by the color (orange in the preferred embodiment) of the outline for each solid bar.

Power levels for active code channels in the C5 active code layer are displayed using solid bars 65. Solid bars are identified as power levels for active code channels in the C5 active code layer by the width of each solid bar and by the color (blue in the preferred embodiment) of the outline for each solid bar.

Power levels for active code channels in the C4 active code layer are displayed using solid bars 67. Solid bars are identified as power levels for active code channels in the C4 active code layer by the width of each solid bar and by the color (yellow in the preferred embodiment) of the outline for each solid bar.

In screen 31, the power level for code channels which are inactive are displayed by hollow bars 62, hollow bars 64, hollow bars 66 and hollow bars 68. In the preferred embodiment, hollow bars 62, 64, 66 and 68 are outlined in green. When displaying code domain power display for multiple code layers, the inactive channels are shown for the slowest code layer (narrowest bars). A marker 69, placed in a code channel identifies code rate, code number and active level, as shown in a text line 70. Marker 69 indicates that the code channel is a 256 kHz channel (also indicated by width and color), code number 12, with a relative amplitude of −9.0 dB.

The foregoing discussion discloses and describes merely exemplary methods and embodiments of the present invention. As will be understood by those familiar with the art, the invention may be embodied in other specific forms without departing from the spirit or essential characteristics thereof. Accordingly, the disclosure of the present invention is intended to be illustrative, but not limiting, of the scope of the invention, which is set forth in the following claims.

We claim:

1. A method for displaying power levels for a code-division multiple access (CDMA) signal with layered orthogonal codes comprising the following step:
   (a) when displaying power levels for multiple code layers on a single screen, performing the following substep:
      (a.1) displaying a power level for each active code channel using a bar, wherein a width of the bar indicates in which code layer each active code channel is active.

2. A method as in claim 1 wherein in substep (a.1) width of bars in a particular code layer is determined by a number of code channels in the particular layer so that a faster code layer will have a bar that is twice as wide as a next slower code layer.

3. A method as in claim 1 wherein step (a) additionally includes the following substep:
   (a.2) when a user places a marker on a first bar representing a first code channel, displaying text which indicates a code layer, a code channel number and a power level for the first code channel.

4. A method as in claim 1 wherein in substep (a.1) a color of the bar also indicates in which code layer each active code channel is active.

5. A method as in claim 1 wherein step (a) additionally includes the following substep:
   (a.2) displaying a power level for each inactive code channel using a line.

6. A method as in claim 1 wherein step (a) additionally includes the following substep:
(a.2) displaying a power level for each inactive code channel using a hollow bar;
wherein in substep (a.1) power level for each active code channel is displayed using a solid bar.

7. A method as in claim 1 additionally comprising the following step:
(b) when displaying power levels for a single code layer, performing the following substeps:
(b.1) displaying a power level for each active code channel in the single code layer using a hollow bar, and
(b.2) displaying a power level for each code channel which is inactive in the single code layer using a line.

8. A method as in claim 7 wherein step (a) and step (b) are performed simultaneously in separate screens of a display.

9. A method as in claim 1 additionally comprising the following step:
(b) when displaying power levels for a single code layer, performing the following substeps:
(b.1) displaying a power level for each active code channel in the single code layer using a solid bar, and
(b.2) displaying a power level for each code channel which is inactive in the single code layer using a hollow bar.

10. A method for displaying power levels for a code-division multiple access (CDMA) signal comprising the following step:
(a) displaying power levels for a single code layer, including the following substeps:
(a.1) displaying a power level for each active code channel in the single code layer using a bar, and
(a.2) displaying a power level for each code channel which is inactive in the single code layer using a line.

11. A method for displaying power levels for a code-division multiple access (CDMA) signal comprising the following step:
(a) displaying power levels for a single code layer, including the following substeps:
(a.1) displaying a power level for each active code channel in the single code layer using a solid bar, and
(a.2) displaying a power level for each code channel which is inactive in the single code layer using a hollow bar.

12. A code-division multiple access (CDMA) signal analyzer comprising:
despread means for determining power for code channels across a CDMA signal;
active code channel identification means for identifying which code channels within each code layer of the CDMA signal; and
display means, coupled to the despread means and the active code channel identification means for, when displaying power levels for multiple code layers on a single screen, displaying a power level for each active code channel using a bar, wherein a width of the bar indicates in which code layer each active code channel is active.

13. A CDMA signal analyzer as in claim 12 wherein when the display means displays power levels, a color of the bar also indicates in which code layer each active code channel is active.

14. A CDMA signal analyzer as in claim 12 wherein the display means displays power level for each inactive code channel using a line.

15. A CDMA signal analyzer as in claim 12 wherein the display means displays power level for each inactive code channel using a hollow bar and wherein the display means displays power level for each active code channel using a solid bar.

16. A CDMA signal analyzer as in claim 12 wherein the display means is additionally for displaying power levels for a single code layer so that power level for each active code channel is displayed in the single code layer using a bar, and power level for each code channel which is inactive is displayed in the single code layer using a line.

17. A CDMA signal analyzer as in claim 12 wherein the display means is additionally for displaying power levels for a single code layer so that power level for each active code channel is displayed in the single code layer using a solid bar, and power level for each code channel which is inactive is displayed in the single code layer using a hollow bar.

18. A CDMA signal analyzer as in claim 12 wherein the despread means includes a code layer despread for each of a plurality of code layers of the CDMA signal.

19. A CDMA signal analyzer as in claim 12 wherein as displayed by the display means, width of bars in a particular code layer is determined by a number of code channels in the particular layer so that a faster code layer will have a bar that is twice as wide as a next slower code layer.

20. A method as in claim 12 wherein the display means displaying text which indicates a code layer, a code channel number and a power level for a first code channel represented by a first bar when a user places a marker on the first bar.

21. A code-division multiple access (CDMA) signal analyzer comprising:
despread means for determining power for code channels across a CDMA signal;
active code channel identification means for identifying which code channels within each code layer of the CDMA signal are active; and
display means, coupled to the despread means and the active code channel identification means for displaying power levels for a single code layer so that power level for each active code channel in the single code layer is displayed and so that power level for each code channel which is inactive in the single code layer is displayed in such a way to identify which code channels are active and which code channels are inactive.

22. A CDMA signal analyzer as in claim 21 wherein the display means displays power level for each active code channel in the single code layer using a bar and displays power level for each code channel which is inactive in the single code layer using a line.

23. A CDMA signal analyzer as in claim 21 wherein the display means displays power level for each active code channel in the single code layer using a solid bar and displays power level for each code channel which is inactive in the single code layer using a hollow bar.

* * * * *